United States Patent [19]

Shimizu et al.

[11] 4,212,951
[45] Jul. 15, 1980

[54] PROCESS FOR THE ISOLATION OF POLYARYLENE ESTERS

[75] Inventors: Senzo Shimizu, Odawara; Isao Nomura, Hiratsuka; Motohachi Usui, Odawara; Masahiro Harada, Hiratsuka, all of Japan

[73] Assignee: Mitsubishi Gas Chemical Co., Inc., Tokyo, Japan

[21] Appl. No.: 964,441

[22] Filed: Nov. 28, 1978

[30] Foreign Application Priority Data

Nov. 29, 1977 [JP] Japan ............................ 52-143075

[51] Int. Cl.$^2$ ................. C08G 63/72; C08G 63/74
[52] U.S. Cl. ............................ 528/495; 528/176; 528/179; 528/486; 528/491; 528/493; 528/495
[58] Field of Search ............ 528/495, 176, 179, 496, 528/493, 486, 491

[56] References Cited

U.S. PATENT DOCUMENTS

3,953,401  4/1976  Gabler et al. ..................... 528/499

FOREIGN PATENT DOCUMENTS

49-50119  2/1974  Japan ................................ 528/491
49-78794  7/1974  Japan ................................ 528/491

*Primary Examiner*—Lester L. Lee
*Attorney, Agent, or Firm*—Wenderoth, Lind & Ponack

[57] ABSTRACT

A process for the isolation of particulate polyarylene esters having good thermal stability and hydrolytic stability, which comprises adding to a solution of a polyarylene ester in an organic solvent a poor solvent for the polyarylene ester at least in an amount such that said solution reaches a cloud point, followed by subjecting said mixed solution to an aging treatment whereby the polyarylene ester precipitates as solids, characterized in that said poor solvent is a mixed poor solvent consisting of 5–95% by weight of an aliphatic alcohol with 1–5 carbons and the other poor solvent for the polyarylene ester, the amount of said mixed poor solvent added being within the range of 100–200% by weight of the amount such that said solution reaches the cloud point and not exceeding the amount of said solution.

13 Claims, No Drawings

PROCESS FOR THE ISOLATION OF POLYARYLENE ESTERS

BACKGROUND OF THE INVENTION

The present invention relates to a process for the isolation of a polyarylene ester from a solution of a polyarylene ester in an organic solvent. More particularly, it relates to a process for the isolation of a particulate, uniform polyarylene ester solid having a high bulk density and good thermal stability and hydrolytic stability from a solution of a polyarylene ester in an organic solvent, said polyarylene ester being obtained by polycondensing dihydric phenol compounds with aromatic dicarboxylic acids or aromatic dicarboxylic acid derivatives.

Polyarylene esters obtained from aromatic dicarboxylic acids or derivatives thereof, such as dicarboxylic acid dichloride and dihydric phenol compounds, are polymers which are good in thermal stability as well as in fire retardency and excellent in mechanical and other various properties. As a process for the preparation of the said polymers are known interfacial polycondensation, solution polycondensation and melt polycondensation processes.

In particular, the interfacial polycondensation process gives a polymer with high degrees of polymerization at low temperature and has thus far been generally regarded as advantageous in terms of a commercial process. The conventional interfacial polycondensation technique for the production of polyarylene ester utilizes the interface between water and a water-insoluble organic solvent, such as dichloromethane, dichloroethane, xylene or toluene, to perform the polycondensation reaction. It is dichloromethane or dichloroethane in which the polymer formed dissolves, in particular that is well used. In this case, polyarylene ester is obtained as a solution in a water-insoluble organic solvent, such as dichloromethane.

The desired polymer is generally isolated from the reaction mixture obtained by this process following the procedure involving, first, separating the reaction mixture into a polymer solution layer and an aqueous layer, subjecting the polymer solution to a purification treatment to remove impurities present (such as a sodium salt of unreacted dihydric phenol compound and NaCl formed as a by-product by the reaction) insofar as possible, and then separating the polymer from the purified polymer solution. The purification treatment of the polymer solution is usually carried out by repeating a procedure of washing the polymer solution with a great deal of an alkaline or acidic aqueous solution or water and then separating the organic layer from the aqueous layer. The polymer from the purified polymer solution is usually isolated by concentrating the polymer solution to gel the polymer, or by contacting the polymer solution with a great deal of a poor solvent for the polymer, such as acetone or methanol, to precipitate and then filter the polymer.

The said process of subjecting the polymer solution to purification treatment in advance and then separating the polymer from the polymer solution entails many such drawbacks as to be complicated in a cleansing operation, an operation for separation into the organic layer and the aqueous layer and an operation for solidification and isolation of the polymer, or to be inefficient in recovery of a poor solvent, such as methanol and acetone and of a reaction solvent, such as dichloromethane and dichloroethane.

Proposals have been made for the process designed to overcome these drawbacks. Mention can be made, for instance, of a process which comprises concentrating suitably a solution of a polymer obtained by the interfacial polycondensation process in dichloromethane, followed by addition to the concentrated solution of predetermined amount of a poor solvent for the polymer whereby the polymer can be isolated as finely divided solids (Japanese Laid-Open Patent Application (KOKAI) No. 49-78794) or of a process which comprises diluting a solution of a polymer in dichloromethane by addition of a poor solvent for the polymer until the polymer solution reaches the cloud point, and aging the dilute solution, followed by further addition of the poor solvent whereby the polymer can be isolated as finely divided solids (Japanese Laid-Open Patent Application (KOKAI) No. 14598). True, these processes are considered practical as compared with prior art processes, but it is still required to use a comparatively great deal of a poor solvent, and in many cases, it takes a considerable time before it is finely divided. Often, the polymer isolated is not always good in thermal stability, as well as in hydrolytic stability. Thus, these processes still entail a variety of defects.

In some embodiments of the said improved processes, alochols are used as a poor solvent to be added to the solution of polyarylene ester in an organic solvent. The instant inventors learned that when alcohols were used in 0.1–1.0-fold amounts, by weight ratio, based on the solution of the polymer in the organic solvent in such an embodiment, the polymer could be obtained as rice cake-like coagulated solids, which could be no more finely divided as particulate solids in the solution.

The primary purpose of the present invention is to provide a practical process of isolating polyarylene ester as particulate solids from a solution of polyarylene ester in an organic solvent. Another purpose of the present invention is to obtain polyarylene esters having good thermal stability and hydrolytic stability in comparison with polyarylene esters obtained by conventionally known isolation methods.

SUMMARY OF THE INVENTION

The present invention is designed to provide a process for the isolation of particulate polyarylene esters having good thermal stability and hydrolytic stability, which comprises adding to a solution of a polyarylene ester in an organic solvent a poor solvent for the polyarylene ester at least in an amount such that said solution reaches a cloud point, followed by subjecting said mixed solution to aging treatment whereby the polyarylene ester precipitates as solids, characterized in that said poor solvent is a mixed poor solvent consisting of 5–95% by weight of an aliphatic alcohol with 1–5 carbons and the other poor solvent for the polyarylene ester, the amount of said mixed poor solvent added being within the range of 100–200% by weight of the amount such that said solution reaches the cloud point and not exceeding the amount, by weight, of said solution.

DETAILED DESCRIPTION OF THE INVENTION

By way of instant invention it is found in isolating a polyarylene ester as solids by adding a poor solvent for the polyarylene ester to a solution of a polyarylene ester in an organic solvent that by using, as a poor solvent, a mixed poor solvent consisting of 5-95% by weight of at least one member of aliphatic alcohols with 1-5 carbons and the other poor solvent for the polyarylene ester, particulate, uniform polyarylene ester solids having a high bulk density can be isolated in a very short period of time with the poor solvent used in a very small amount.

As mentioned earlier, in the case of using, as a poor solvent, alcohols alone for the isolation of polyarylene ester from a solution of polyarylene ester in an organic solvent, the polyarylene ester could never be finely divided into a particulate form. In the case, on the other hand, of using, as a poor solvent, a solvent such as aliphatic hydrocarbons, ketones, esters and so on, the polyarylene ester obtained could be inferior in thermal stability as well as in hydrolytic stability. In view of these facts it was unexpected and really surprising that by use of a mixed poor solvent comprising 5-95% by weight of at least one member of aliphatic alcohols with 1-5 carbons and the other poor solvent for the polyarylene ester as specified in the present invention the particulate solidification of polyarylene ester was rendered easy and that the polyarylene ester obtained was excellent in thermal stability as well as in hydrolytic stability.

The solution of polyarylene ester in an organic solvent (hereinafter called the polymer solution for short) in the present invention can include not only a solution in which polyarylene ester synthesized by a process such as interfacial polycondensation, low temperature solution polycondensation or high temperature solution polycondensation, using, as main starting materials, aromatic dicarboxylic acid dichloride and dihydric phenol compounds, is dissolved in an organic solvent selected from the class consisting of dichloromethane, dichloroethane and chloroform, but also a solution in which polyarylene ester obtaineed by the polycondensation process other than the abovementioned, such as the melt process using, as starting material, aromatic dicarboxylic acid diaryl esters and dihydric phenol compouns, is dissolved in the said organic solvent.

The process of the present invention describes, as essential requirement, addition to the polymer solution of the mixed poor solvent consisting of 5-95% by weight of at least one member of aliphatic alcohols with 1-5 carbons and the other poor solvent for the polyarylene ester, and the amount of the mixed poor solvent added is swayed by the cloud point of the polymer solution. That is, with addition of the mixed poor solvent of the present invention going on while under stirring the said polymer solution comes to show turbidity. This point at which turbidity shows itself is called the cloud point in the instant specification. When the polymer solution reaching the cloud point is further stirred without addition of the mixed poor solvent, turbidity increases. Turbidity of the polymer solution implies precipitation, as solids, of the polymer in the solution, and it has been found that the polymer solution with increased turbidity soon comes to take a rice cake form as a whole with coagulation of solids precipitated and that with further continued stirring the polymer solids coagulated loses tackiness between polymers solids to solidify to a particulate form and disperse in the solution. That is, the polymer solution reaching the cloud point is transformed by the aging treatment under stirring into the solution in which the polymer is dispersed as particulate solids. Polymer solids formed could be collected quantitatively in substance by filtering this solution.

The polymer solution of the present invention reaching the cloud point may be subjected to the aging treatment without stirring. In this case, upon standing of the said polymer solution it separates into an organic solution layer having the polymer dissolved and an organic solvent layer hardly containing any polymer. The former solution layer increases its viscosity by degrees until it solidifies to an agar form. If the agar form is crushed by once again stirring intensely, the polymer comes to disperse in the organic solvent as particulate solids, and the polymer solids can be collected by filtering.

The process of the present invention, as mentioned above, is carried out by adding to the polymer solution a mixed poor solvent consisting of an aliphatic alcohol in the amount as prescribed in the present invention and the other poor solvent until the polymer solution reaches the cloud point and subjecting the polymer solution reaching the cloud point to the aging treatment whereby to finally isolate the polymer as particulate solids. The term "aging treatment" used throughout the instant specification implies that the polymer solution is left to stand at room temperature and atmospheric pressure with or without stirring.

The present invention will not be bound by the hereinbelow-described theory, but this aging treatment is considered to cause the change in the state of dissolution of polyarylene ester in the solution to shift to a condition where polyarylene ester is liable to precipitate. This charge in the state of dissolution is presumably due to the fact that polyarylene ester molecules dissolved in the solution come close to each other and coagulate.

For causing the change in the state of dissolution of polyarylene ester with aging treatment it is necessary to add the mixed poor solvent as specified in the present invention in a small amount to the solution of polyarylenes ester dissolved in the organic solvent selected from the class of dichloromethane, dichloroethane and chloroform. The aging treatment changes the polymer in the solution to a rice cake form while under stirring, or the polymer solution to an agar form on standing and finally the polymer come to disperse in the organic solvent as particulate solids.

In the process of the present invention, the amount of the mixed poor solvent added may exceed the amount required until the polymer solution reaches the cloud point. When it considerably exceeds the said amount, it hinders the uniformity in the configuration of particulate polymers and in turn, makes bad handling-workability of solidified particulate polymers. It also forms a cause for causing thermal stability, hydrolytic stability and mechanical properties of polymer obtained to go bad. Needless to say that loads go high in the respect of separation and recovery of a reaction solvent and poor solvents. The amount of the mixed poor solvent added, therefore, should preferably be chosen in the range of 100-200% by weight the amount required until the polymer solution reaches the cloud point. In some cases, however, it is necessary to add a great deal of the mixed poor solvent until the polymer solution reaches the cloud point depending upon the kind of a solvent used in the polymer solution, a concentration of the polymer or the kind of the other poor solvent used with alcohols. Addition of a great deal of the mixed poor solvent brings about the said inconveniences and the purposes of the present invention cannot be achieved. Under such circumstances, the amount of the mixed poor solvent to be added to the polymer solution should not be in excess of the amount, by weight, of the polymer solution.

In the process of the present invention it is a preferred embodiment to add the mixed poor solvent in parts. That is, when the mixed poor solvent is at first added until the polymer solution reaches the cloud point or until it exceeds the cloud point to some extent and then added anew in the amount not exceeding the prescribed amount at the point of time when nearly all polymers were precipitated in a particulate form through the aging treatment, particulate solid polymers precipitated can be immediately filtered out and isolated. The secondary addition of the mixed poor solvent accelerates the solidification of polymer particles precipitated, and in the final analyses, is advantageous in the respect of enhancing efficiency of operation for the isolation of the polymer.

In the process of the present invention, it is usually preferred to add to the polymer solution a mixed poor solvent consisting of 5-95% by weight of at least one member of aliphatic alcohols with 1-5 carbons and the other poor solvent for the polyarylene ester. But the intended polymer may be obtained as particulate solids by subjecting the polymer solution reaching the cloud point to the aging treatment, regardless of which embodiment, either a predetermined amount of an aliphatic alcohol is first added to the polymer solution, followed by further addition of the other poor solvent, or reversely, the other poor solvent is first added to the polymer solution, followed by further addition of the alcohol, and these are feasible as the varied embodiments of the process of the present invention.

Aliphatic alcohols with 1-5 carbons used in the present invention are, of course, strong poor solvents for polyacrylene esters, but as the other poor solvent used with these alcohols can be listed ketones illustrated as acetone, methylethylketone, and methylisobutylketone; esters illustrated as methyl acetate, ethyl acetate and butyl acetate; aromatic hydrocarbons illustrated as xyelene, ethylbenzene and mesitylene; aliphatic hydrocarbons illustrated as hexane, heptane and octane and so forth.

According to the process of the present invention as detailed above, solid polyarylene ester could be isolated in a very short period of time with an extremely small amount of the mixed poor solvent from the solution of polyarylene ester in the organic solvent, wherein polyarylene ester is dissolved in the organic solvent selected from the class consisting of dichloromethane, dichloroethane and chloroform, and solid polyarylene ester obtained is characteristic in the respect that it takes a uniform particulate form and is excellent in the thermal stability as well as in hydrolytic stability.

The solid particulate polymer obtained by the process of the present invention could be suitably separated and collected by means of centrifugation, filtration or the like. This particulate polyarylene ester, after drying, can be directly fed to an extruder to be converted into pellets without passing through a milling step and/or a screening step. This offers another practical advantage.

The polymer solution to be used in the process of the present invention should preferably have polyarylene ester dissolved in a concentration falling in the range of 5-35% by weight, preferably 15-25% by weight.

Polyarylene ester to be used in the present invention is synthesized from a dihydric phenol compound and an aromatic dicarboxylic acid or derivative thereof. Specifically, the dihydric phenol compound is expressed by the general formula:

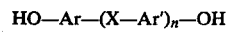

HO—Ar—(X—Ar')$_n$—OH wherein Ar and Ar' stand each for an arylene group selected from the class consisting of phenylene and napthalene, X stands for a bridging member selected from the class consisting of a direct single bond, a methylene group, an alkylidene group with 2 to 5 carbon atoms, an ether group, a carbonyl group, a sulfite group, a sulfoxide group and a sulfonyl group, and n stands for 0 or 1.

Suitable dihydric phenol compounds of the said general formula include, for example, bis(4-hydroxyphenyl)methane, bis(4-hydroxy-3-methylphenyl) methane, bis(4-hydroxy-3,5-dichlorophenyl)methane, bis(4-hydroxyphenyl)-ketone, bis(4-hydroxyphenyl) sulfite, bis(4-hydroxyphenyl)-sulfone, 4,4'-dihydroxydiphenyl ester, 2,2-bis(4-hydroxyphenyl)propane, 2,2-bis(4-hydroxy-3,5-dichlorophenyl)-propane, 2,2-bis(4-hydroxynaphthyl)propane, hydroquinone, and 4,4'-dihydroxybiphenyl. Phenolphthalein can also be used as dihydric phenol compound.

These compounds can be used in combination. It is 2,2-bis(4-hydroxyphenyl)propane that is particularly preferred as dihydric phenol compound.

The aromatic dicarboxylic acid is expressed by the general formula:

HOOC—Ar"—COOH wherein Ar" stands for an arylene group, such as o-phenylene, m-phenylene, p-pheylene or napthylene group, which may be substituted with an alkyl group having 1 to 3 carbon atoms, or a halogen atom.

By the aromatic dicarboxylic acid are specifically meant phthalic acid, terephthalic acid, isophthalic acid, and naphthalene dicarboxylic acid. Reactive derivatives of these aromatic dicarboxylic acids could also be used. The derivatives of the aromatic dicarboxylic acids are dichlorides or diesters, such as alkyl esters with 1 to 3 carbon atoms or phenyl esters of these aromatic dicarboxylic acids. Examples of the derivatives of the aromatic dicarboxylic acids are terephthaloyl dichloride, isophthaloyl dichloride, phthaloyl dichloride, diphenyl terephthalate, diphenyl isophthalate, diphenyl phthalate, dimethyl isophthalate, dimethyl terephthalate, and dimethyl phthalate. These compounds can be used in combination. Terephthaloyl dichloride and/or isophthaloyl dichloride are especially preferred as aromatic dicarboxylic acids or derivatives thereof used in the present invention.

The contents of the present invention will be explained in reference to specific examples as follows: In this connection, logarithmic viscosity of polymer in examples is calculated by equation to follow:

$$\eta_{inh} = \ln\{t_1/t_0\}/C$$

$t_1$: time in seconds required for the fall or polymer solution in chloroform,
$t_0$: time in seconds required for the fall of chloroform,
C: amount of polymer per 100 ml of polymer solution (measured at conditions of 1.0 g/100 ml).

REFERENTIAL EXAMPLE 1

A flask equipped with a stirrer, reflux condenser, dropping funnel, nitrogen conduit tube and thermometer was charged with 22.85 g (0.100 mole) of thoroughly purified 2,2bis(4-hydroxyphenyl)propane and 220 ml of tetrahydrofuran to form a solution. To the solution were added 36 g of sodium chloride, 9.0 g of sodium hydroxide and 180 ml of water. Then, solution of 10.33 g (0.051 mole) of terephthaloyl dichloride, and 10.33 g (0.051 mole) of isophthaloyl dichloride in 220 ml of dry tetrahydrofuran was poured into the flask while under vigorous stirring. The reaction was finished in about 5 minutes. After the reaction was completed, the resulting mixture was neutralized with 0.1 N aqueous phosphoric acid solution, and aqueous phase was removed. Thus, organic solvent solution consisting mainly of polyarylene ester and tetrahydrofuran was recovered. The organic solution was put into a great deal of water while under stirring and solids precipitated were separated by filtering to afford powdered polyarylene ester having logarithmic viscosity of 0.61.

REFERENTIAL EXAMPLE 2

A separable flask equipped with a stirrer, reflux condenser, dropping funnel, nitrogen conduit tube and thermometer was charged with 22.83 g (0.100 mole) of 2,2-bis(4-hydroxyphenyl)propane, 0.384 g (0.0041 mole) of phenol, 8.57 g (0.214 mole) of sodium hydroxide and 136.1 ml of water. The mixture was uniformly dissolved. To the solution were added 68 ml of dichloromethane and 0.068 g of benzyl trimethyl ammonium chloride, and stirred. Then, solution of 10.36 g (0.051 mole) each of isophthaloyl dichloride and terephthaloyl dichloride in 68 ml of dichloromethane was added dropwise, and the reaction was performed at 25° C. for 4 hours, and solution of polymer in dichloromethane was separated from aqueous layer. Thus, organic solvent solution consisting mainly of polyarylene ester and dichloromethane was obtained.

The organic solution was thoroughly washed with water, and put into a great deal of vigorously stirred methanol. Solids precipitated were separated by filtering to afford powdered polyarylene ester having logarithmic viscosity of 0.65.

EXAMPLE 1

Solution of polyarylene ester in dichlormethane obtained in Referential Example 2 was thoroughly purified and then concentrated to make 20% (by weight) solution. Added while under stirring to 100 parts by weight of this solution of polyarylene ester in dichloromethane with 20% concentration was 35 parts by weight of mixed poor solvent with a composition of mix ratio by weight of methanol/acetone of ½. The solution went turbid. With further addition of 10 parts by weight of the said mixed poor solvent stirring was continued for the aging treatment. After about 15 minutes polyarylene ester was obtained in a condition where it was dispersed in a particulate form in solution, and solid polyarylene ester could be collected by filtering. Particulate polyarylene ester obtained was 0.65 in logarithmic viscosity. Yield of polyarylene ester was 19.5 parts by weight. This polyarylene ester was dried at 120° C. for 7 hours in hot air drier and offered for heat-resistant and hot water-resistant tests to follow. The heat-resistant test was conducted by melting polyarylene ester in N2 by application of heat at 350° C. for 30 minutes and calculating percent persistence of logarithmic viscosity from its measured values before and after testing to compare percentages of persistence of logarithmic viscosity. The hot water-resistant test, on the other hand, was conducted by redissolving polyarylene ester in dichloromethane to flow on a glass plate for the formation of film about 80μ thick and conducting the test to immerse the resultant film in hot water (in autoclave) held at 120° C. for 50 hours to calculate percent persistence of logarithmic viscosity from its measured values before and after testing for comparison of percentages of persistence of logarithmic viscosity.

Percentages of persistence of logarithmic viscosity with polyarylene ester obtained in the heat resistant-test and in the hot water resistant-test were 82% and 90% respectively.

COMPARATIVE EXAMPLE 1—1

Solution of polyarylene ester in dichloromethane obtained in Referential Example 2 was throughly cleansed, purified, and then concentrated to make 20% (by weight) solution. 35 parts by weight of acetone was added while under stirring to 100 parts by weight of this dichloromethane solution. The solution went turbid. 10 parts by weight of acetone was successively added and aged with continued stirring. After about 15 minutes polyarylene ester was obtained in a condition where it was dispersed in a particulate form in solution. This polyarylene ester could be collected by filtering, and particulate polyarylene ester obtained was 0.65 in logarithmic viscosity. Yield of polyarylene ester was 19.5 g. The heat resistant-test and hot water resistant-test were conducted at the same conditions as in Example 1 on polyarylene ester obtained, in consequence of which percentages of persistence of logarithmic viscosity were respectively 78% and 70%. It was found to be inferior in thermal stability and in hydrolytic stability as compared with the polymer isolated with the alcohol-containing mixed poor solvent of the present invention.

COMPARATIVE EXAMPLE 1-2

Methanol was added while under stirring to 100 parts by weight of solution of polyarylene ester in dichloromethane used in Comparative Example 1—1. The solution already went turbid at the point of time when 20 parts by weight of methanol was added. 20 parts by weight of methanol was successively added and polymer came to take a tacky rice cake-line form. Even after stirring was continued for another 2 hours, no changing occurred to the rice cake-like form, and particulate solid polyarylene ester could not be obtained.

EXAMPLE 2

Solution of polyarylene ester in dichloromethane obtained in Referential Example 2 was thoroughly purified, and then concentrated to 20% (by weight) solution. Added while under stirring to 100 parts by weight of this solution of polyarylene ester in dichloromethane with concentration of 20% was 100 parts by weight of mixed poor solvent with a composition of mix ratio by weight of methanol/ethylbenzene of ½. Stirring was stopped, and upon standing the solution was separated into an organic solvent layer hardly containing any polymer in the upper part and an organic solution layer containing the polymer in the lower part. Aged as such, the polymer-containing organic solution layer in the lower layer solidified to an agar form. When stirring was started again, polyarylene ester was put in a condition where it was dispersed in a solid particulate form in organic solvent. This polyarylene ester was collected by filtering. Particulate polyarylene ester obtained was 0.65 in logarithmic viscosity. Heat resistant-test and hot water-resistant test were conducted at the same conditions as in Example 1, in consequence of which percentages of persistance of logarithmic viscosity were respectively 80% and 90%.

COMPARATIVE EXAMPLE 2

Treatment was effected in the same way as in Example 2 except that ethylbenzene was substituted for the methanol/ethylbenzene mixed poor solvent. The solution of polyarylene ester in dichloromethane with ethylbenzene added was totally free from turbidity, and even after aging for 3 hours precipitation of polymer was not recognised at all.

EXAMPLE 3

Solid polyarylene ester obtained in Referential Example 1 was dissolved in dichloromethane to formulate 20% (by weight) solution. 15 parts by weight of methanol was added while under stirring to 100 parts by weight of this solution. The polymer solution was held in a transparent condition. After stirring for 10 minutes 35 parts by weight of ethyl acetate was added. The solution went turbid. When the stirring was stopped, it was separated into an organic solvent layer not containing any polymer in the upper part and an organic solution layer containing nearly all polymers in the lower part. Aged with continued stirring, in about 20 minutes, solid polyarylene ester was obtained in a condition where it was dispersed in a particulate form in solutuon. Polyarylene ester obtained by filtering was 0.61 in logarithmic viscosity.

Heat-resistant test and hot water-resistant test were conducted at the same conditions as in Example 1, in consequence of which percentages of persistence of logarithmic viscosity were respectively 83% and 90%.

COMPARATIVE EXAMPLE 3

Solid polyarylene ester obtained in Referential Example 1 was dissolved in dichloromethane to formulate 20% (by weight) solution. 50 Parts by weight of methyl acetate was added while under stirring to 100 parts by weight of this solution. The solution went turbid. When the stirring was stopped, it was found to separate into an organic solvent layer not containing any polymer in the upper part and an organic solution layer containing nearly all polymers in the lower part. With continued stirring, in about 20 minutes, polyarylene ester could be obtained in a condition where it was dispersed in a particulare form in solution. Solid polyarylene ester obtained by filtering was 0.61 in logarithmic viscosity.

Heat-resistant test and hot water-resistant test were conducted at the same conditions as in Example 1, in consequence of which percentages of persistence of logarithmic viscosity were respectively 75% and 70%. It was found to show inferior results to that with the polymer isolated by the process of the present invention.

EXAMPLE 4

Solid polyarylene ester obtained in Referential Example 1 was dissolved in dichloromethane to formulate 25% (by weight) solution. Added while under stirring to 100 parts by weight of this solution was 40 parts by weight of mixed poor solvent with a composition of mix ratio by weight of methylethylketone/isopropyl alcohol of 2/1. The solution went turbid. Stirring was continued for about 1 hour and polyarylene ester was obtained in a condition where it was dispersed in solvent as semi-solids considerably high in viscosity. 100 parts by weight of mixed poor solvent with the same composition was further added, and stirring was continued for another 10 minutes. As a result, polyarylene ester took a solid particulate form and reached a condition where particulate solids were dispersed in organic solvent. Polyarylene ester collected by filtering was 0.61 in logarithmic viscosity.

Heat-resistant test and hot water-resistant test were conducted on polyarylene ester obtained at the same conditions as in Example 1, in consequence of which percentages of persistence of logarithmic viscosity were respectively 81% and 92%.

EXAMPLE 5

Solution of polyarylene ester in dichloromethane obtained in Referential Example 2 was thoroughly cleansed, purified, and then concentrated to make 20% (by weight) solution. 15 parts by weight of acetone was added while under stirring to 100 parts by weight of this polyarylene ester solution. 30 parts by weight of methanol was successively added, and the solution went turbid. This solution was subjected to the aging treatment with continued stirring, and after about 30 minutes polyarylene ester was obtained in a condition where it was dispersed in a particulate solid form and could be collected by filtering. Polyarylene ester obtained was 0.65 in logarithmic viscosity.

Heat-resistant test and hot water-resistant test were conducted, in consequence of which percentages of persistence of logarithmic viscosity were respectively 80% and 91%.

EXAMPLE 6

Solid polyarylene ester synthesized in Referential Example 1 was dissolved in dichloroethane to make 15% (by weight) solution. Added to 100 parts by weight of this polyarylene ester solution was 40 parts by weight of mixed poor solvent with a composition of mix ratio by weight of methanol/acetone of ⅓. The solution went turbid 10 parts by weight of methanol/acetone mixed poor solvent was further added, and stirring was continued. After about 30 minutes polyarylene ester was obtained as particulate solids dispersed in organic solvent.

What is claimed is:

1. A process for the isolation of particulate polyarylene esters having good thermal stability and hydrolytic stability, which comprises adding to a solution of a polyarylene ester in an organic solvent a poor solvent for the polyarylene ester at least in an amount such that said solution reaches a cloud point, followed by subjecting said mixed solution to an aging treatment in which the mixed poor solvent-containing solution is allowed to stand with or without stirring whereby the polyarylene ester precipitates as solids, characterized in that said poor solvent is a mixed poor solvent consisting of 5-95% by weight of an aliphatic alcohol having 1-5 carbons and another poor solvent for the polyarylene ester selected from the class consisting of ketones, esters, aromatic hydrocarbons and aliphatic hydrocarbons, the amount of said mixed poor solvent added being within the range of 100-200% by weight of the amount such that said solution reaches the cloud point and not exceeding the amount of said solution.

2. A process described in claim 1 wherein the organic solvent is selected from the class consisting of dichloromethane, dichloroethane and chloroform.

3. A process described in claim 1 wherein the ketones are selected from the class consisting of acetone, methylethyl ketone and methylisobutyl ketone.

4. A process described in claim 1 wherein the esters are selected from the class consisting of methyl acetate, ethyl acetate and butyl acetate.

5. A process described in claim 1 wherein the aromatic hydrocarbons are selected from the class consisting of xylene, ethylbenzene and mesitylene.

6. A process described in claim 1 wherein the aliphatic hydrocarbons are selected from the class consisting of hexane, heptane and octane.

7. A process described in class 1 wherein the polyarylene ester is obtained by polycondensing a dihydric phenol compound with an aromatic dicarboxylic acid or a dichloride thereof.

8. A process described in claim 7 wherein the dihydric phenol compound is represented by the general formula:

$$HO-Ar(X-Ar')_n-OH$$

wherein Ar and Ar' stand each for an arylene group selected from the class consisting of phenylene and naphthylene, X stands for a bridging member selected from the class consisting of a direct single bond, a methylene group, an alkylidene group having 2 to 5 carbon atoms, an ether group, a carbonyl group, a sulfite group, a sulfoxide group and a sulfonyl group, and n stands for 0 or 1.

9. A process described in claim 8 wherein the dihydric phenol compound is 2,2-bis(4-hydroxyphenyl) propane.

10. A process described in claim 7 wherein the aromatic dicarboxylic acid or dichloride thereof is selected from the class consisting of aromatic dicarboxylic acids of the formula $$HOOC-Ar''-COOH$$

wherein Ar" stands for an arylene group selected from the class consisting of o-phenylene, m-phenylene, p-phenylene and naphthylene groups which may be substituted with an alkyl group having 1 to 4 carbon atoms, or with a halogen atom and dichlorides of the aromatic dicarboxylic acids.

11. A process described in claim 10 wherein the derivatives of the aromatic dicarboxylic acid are terephthaloyl dichloride, or isophthaloyl dichloride, or both.

12. A process described in claim 1 wherein the concentration of the polyarylene ester in the organic solvent solution is from 5 to 35% by weight.

13. A process described in claim 1 wherein the addition of the mixed poor solvent is effected with stirring.